United States Patent
Sugaya

[19]
[11] Patent Number: 5,831,370
[45] Date of Patent: Nov. 3, 1998

[54] VIBRATION ACTUATOR

[75] Inventor: Isao Sugaya, Yokohama, Japan

[73] Assignee: Nikon Corporation, Tokyo, Japan

[21] Appl. No.: 665,354

[22] Filed: Jun. 17, 1996

[30] Foreign Application Priority Data

Jun. 15, 1995 [JP] Japan ................................. 7-148607

[51] Int. Cl.⁶ .................................................. H02N 2/00
[52] U.S. Cl. ........................................................ 310/323
[58] Field of Search ................................. 310/323, 328

[56] References Cited

U.S. PATENT DOCUMENTS

| | | | |
|---|---|---|---|
| 4,786,836 | 11/1988 | Tokushima | 310/323 |
| 4,882,500 | 11/1989 | Iijima | 310/323 |
| 5,025,186 | 6/1991 | Tsukada | 310/323 |
| 5,140,215 | 8/1992 | Yamaguchi | 310/323 |
| 5,200,665 | 4/1993 | Iijima | 310/323 |
| 5,237,237 | 8/1993 | Ueda et al. | 310/323 |
| 5,256,928 | 10/1993 | Nishikura et al. | 310/323 |
| 5,343,108 | 8/1994 | Miyazawa et al. | 310/323 |
| 5,453,653 | 9/1995 | Zumeris | 310/323 |
| 5,585,685 | 12/1996 | Maeno et al. | 310/323 |
| 5,592,041 | 1/1997 | Kasuga et al. | 310/316 |
| 5,619,089 | 4/1997 | Suzuki et al. | 310/323 |

FOREIGN PATENT DOCUMENTS

| | | | |
|---|---|---|---|
| 0 523 237 A1 | 8/1992 | European Pat. Off. | 310/329 |
| 0 674 350 A1 | 9/1995 | European Pat. Off. | H01L 41/09 |
| 63-167686 | 7/1988 | Japan | 310/323 |
| 7-143770 | 6/1995 | Japan | H02N 2/00 |
| 8-140377 | 5/1996 | Japan | H02N 2/00 |

OTHER PUBLICATIONS

Ser. No. 08/498,260 filed Jul. 3, 1995 Takagi Nikon Corporation abn.

Ser. No. 08/626,325 filed Apr. 2, 1996 Tomikawa Nikon Corporation.

Ser. No. 08/574,928 filed Dec. 19, 1995 Tomikawa Nikon Corporation.

Ser. No. 08/391,565 Feb. 21, 1995 Tadao Takagi, et al. Nikon Corporation.

Ser. No. 08/642,207 filed May 6, 1996 Tadao Takagi et al. Nikon Corporation.

Ser. No. 08/664,553 filed Jun. 17, 1996 Isao Sugaya Nikon Corporation.

New Edition: Ultrasonic Motors, Sadayuki Ueba, Yoshiroh Tomikawa, 1991 Torikeppsu K.K. (with English translation excerpts), all pages.

Ser. No. 08/607,443 filed Feb. 27, 1996 Tadao Takagi Nikon Corporation.

Ser. No. 08/698,754 filed Aug. 16, 1996 Tadao Takagi Nikon Corporation.

Ultrasonic Motors, Theory and Applications, S. Ueha, Y. Tomikawa, M. Kurosawa, N. Nakamura, Clarendon Press, Oxford, 1993, all pages.

*Primary Examiner*—Thomas M. Dougherty

[57] ABSTRACT

A vibrational actuator excellent efficiency, in which obstructions of the vibration due to support of the elastic member are cancelled as far as possible. The vibration actuator includes an annular elastic body, at least one piezoelectric element provided on one plane of the elastic body, a relative movement member in pressure contact with the elastic body on a second plane thereof, and support members which support the elastic member disposed on the second plane. In the elastic member, a first vibration mode acting as a drive source, and a second vibration mode which is a bending vibration providing a clutch mechanism are generated. The support members are arranged in a nodal circle and a nodal diameter of the second vibration mode generated in the elastic body.

18 Claims, 13 Drawing Sheets

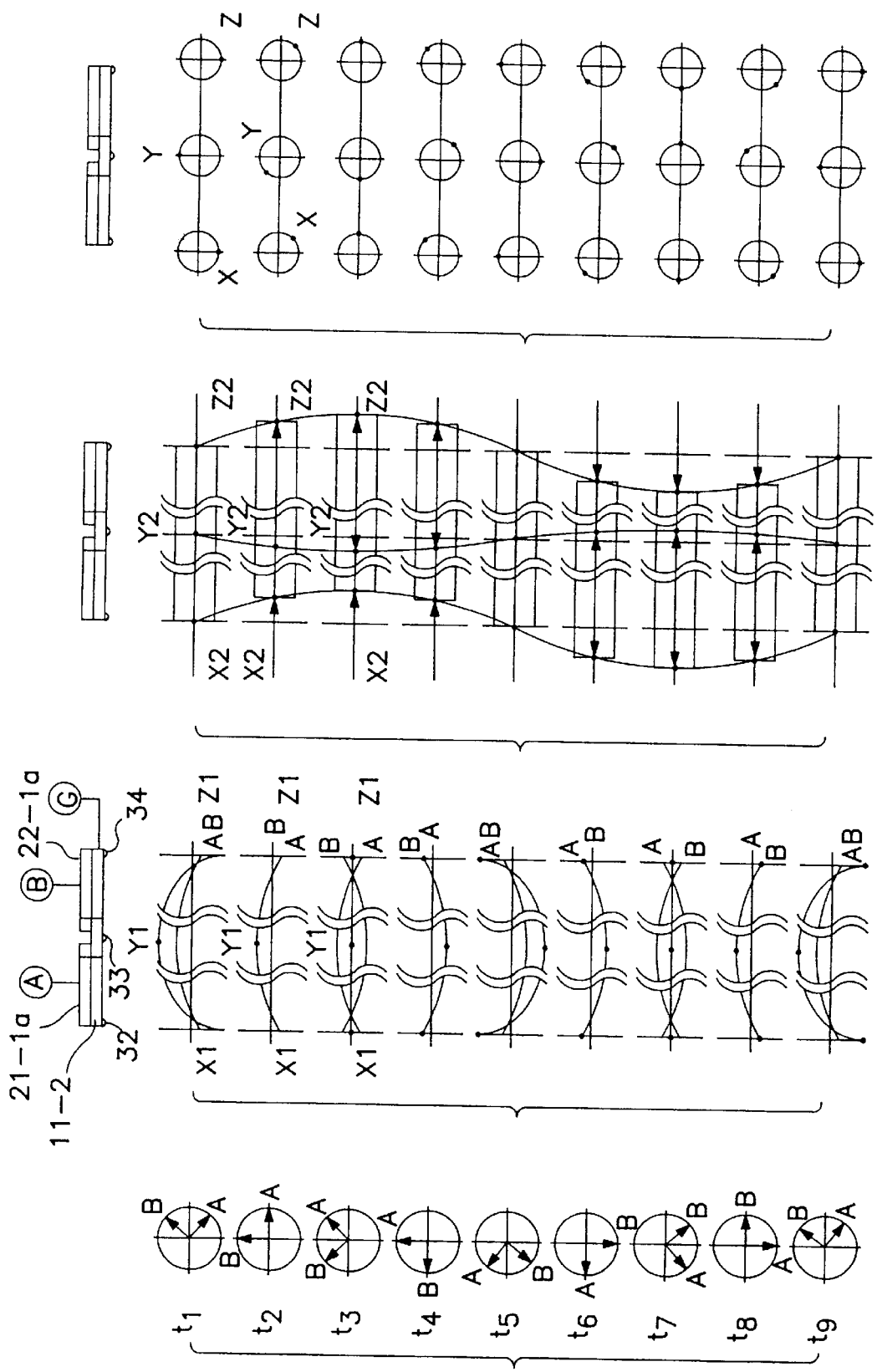

VIBRATION ACTUATOR

CROSS REFERENCE TO RELATED APPLICATIONS

This application is based upon and claims priority from Japanese Patent Application No. 07-148607 filed Jun. 15, 1995, the contents of which are incorporated herein by reference.

BACKGROUND OF THE INVENTION

1. Field of the Invention

The present invention relates to a vibration actuator, such as an ultrasonic motor. More particularly, the present invention relates to an annular form of vibration actuator which uses the degeneracy of expansion and contraction vibrations and bending vibrations, or the degeneracy of nonaxisymmetric vibrations and bending vibrations. Moreover, the present invention improves the support position of the vibration actuator.

2. Description of the Related Art

Heretofore, this kind of vibration actuator, by means of the excitation of electromechanical converting elements, generated travelling waves in an annular elastic member, and was such as to drive a moving member (rotor) making pressure contact with this elastic member.

On the other hand, in a linear type of vibration actuator, an electromechanical converting element has been arranged in order to apply a vibration to one end of a rod-shaped elastic member, and in addition, an electromechanical converting element was arranged at the other end of the rod in order to absorb the reflection of the travelling wave. A travelling wave was then generated from one side to the other side of the elastic member, with the travelling wave driving a moving member which was in pressure contact with the elastic member.

Such a vibration actuator, when incorporated in a lens barrel of a camera, is used for the purpose of driving an auto-focusing (AF) lens by means of the rotation of the moving member.

An image blur prevention device has also been proposed which moves a portion of a photographic optical system in a plane approximately at right angles to the optical axis of the optical system. The image blur prevention device is used to correct blurring of the image. However, the former vibration actuator cannot be applied to the image blur prevention device because the drive direction differs from that for the lens system. On the other hand, the latter vibration actuator is difficult to incorporate into a cylindrical lens barrel. Moreover, in the case of driving in two directions, the X direction and the Y direction, in a plane at a right angle with respect to the optical axis, there was the problem that the devices, both the vibration actuator and the camera, increased in size.

Moreover, in the case of the prior art electromechanical converting elements, which had high speed and low torque characteristics, a gear train was usually necessary in order for the output torque to work. Furthermore, when causing a driven object to move in two directions in a plane, in order to move the driven object in each direction, an independent electromagnetic motor and gear train was necessary for each direction. Because of this, the size of the devices, the camera and the vibration actuator, became large, and the weight thereof was increased. Moreover, there were the problems that the responsiveness of a gear train was low, noise was generated, etc. Consequently, there has been proposed annular forms for vibration actuators, as explained below, which are easily incorporated in units having a cylindrical configuration, and by which movement is possible in one dimension or two dimensions in a plane.

Japanese Patent Application No. 6-318150 discloses a vibration actuator equipped with an annular elastic member formed of elastic material, and an electromechanical converting element which has been joined to this elastic member. The electromechanical converting element is excited by drive signals. In the elastic member, an expansion and contraction motion, which causes vibration in a direction extending diametrally and a contraction direction, and a bending vibration, which causes vibration in a direction at right angles to the joint surface, are generated. The construction is such that by means of these two vibrations, an elliptic motion is generated in a predetermined portion of the aforementioned elastic member.

Japanese Patent Application No. 7-134895 discloses a vibration actuator equipped with an annular elastic member formed of elastic material, and an electromechanical converting element which has been joined to the elastic member. The electromechanical converting element is excited by drive signals and causes the generation of a non-axisymmetric vibration in the advancing direction, and a bending vibration which vibrates in a direction at right angles to a junction plane. The construction is such that by means of these two vibrations, an elliptic motion is then generated in a predetermined portion of the elastic member.

Both of the above-described vibration actuators cause the generation of drive forces by the excitation of impressing a drive voltage on the electromechanical converting element which has been suitably established, in a predetermined plane of the annular elastic member. In the case of the vibration actuator of Japanese Patent Application No. 6-318150, an expansion and contraction motion, which vibrates in the direction in which the diameter of the cylinder extends in the elastic body, and in the contraction direction, and a bending motion which vibrates in a direction at right angles to the junction surface of the electromechanical converting element, are generated. On the other hand, in the vibration actuator of Japanese Patent Application No. 7-134895, a non-axisymmetric vibration, and a bending vibration which vibrates in a direction at right angles to the junction plane of the electromechanical converting element, are generated.

The elastic member, in the plane in which the electromechanical converting element is not joined, is in contact with a corresponding motion member supported by a suitable support member. A corresponding motion is then generated between this corresponding motion member and the elastic member. As a result, when the corresponding motion member is fixed, the elastic member moves. On the other hand, when the elastic member is fixed, the corresponding motion member moves.

However, because these vibration actuators use travelling waves, a portion of the whole elastic member usually vibrates mechanically. Accordingly, the node of the vibration of the travelling wave usually moves periodically.

In the case in which a support member is disposed in order to bring about contact of the elastic member and the corresponding motion member, the support member is preferably caused to contact the elastic member close to a position of a node of the vibration in order not to attenuate the vibration. However, as mentioned hereinbelow, because the node of the vibration moves, a particular support position cannot be set. Because of this, in actuality, a cushioning material has been arranged in the contact surface side of the elastic member and the support member. The elastic member was then pressed towards the corresponding movement member by means of the support member via this cushioning material.

However, even if the elastic member is supported via cushioning material, in comparison with the case in which the elastic member vibrates freely, the vibration becomes obstructed. Moreover, the vibrational energy, passing through the cushioning material escapes to the exterior. Because of this, there was the problem that, when compared with the case in which the elastic member vibrates in a free state, the driving efficiency of the vibration actuator became reduced.

SUMMARY OF THE INVENTION

An object of the present invention is to provide a vibration actuator in which the decrease in vibrational efficiency can be made as small as possible, because the obstruction of the vibration, arising in a case in which the elastic member is supported, is mostly suppressed.

Objects of the present invention are achieved by a vibration actuator using the following vibration theory. Namely, among two kinds of vibrations present in the elastic body for the vibration actuator, the bending vibration operates as an intermittent mechanism of motive power between the elastic member and the corresponding motion member. This bending vibration is a second order bending vibration which has one or more nodal circles and one or more nodal diameters, and is a standing wave. Because of this, it invariably has a node of the vibration in a specific position. Accordingly, by supporting the elastic body by support members on one or both of the nodal circle and the nodal diameter, the obstruction of the vibration can be suppressed as much as possible.

According to a preferred embodiment of the present invention, the vibration actuator comprises a vibration member having an annular shaped, substantially flat elastic body, an electromechanical converting element joined to the elastic body, and a relative motion member which is in pressure contact with the elastic body, and at least one support member that supports the elastic body. By means of the excitation of the electromechanical converting element, in the elastic body, a first vibration mode vibrates within the annular shaped standard surface and flat surface. A second vibration mode, which is a bending vibration having one or more nodal circles and one or more nodal diameters, vibrates in a direction intersecting a standard plane. A vibration which causes relative motion to be performed is caused to arise between the elastic body and the relative motion member. The at least one support member is arranged on the nodal circle and/or on the nodal diameter of the second vibration mode in the elastic body.

Moreover, according to another preferred embodiment of the present invention, a vibration actuator comprises an elastic body formed in an annular shape, and an electromechanical converting element joined to the elastic body, and a relative motion member which is in pressure contact with the elastic body. In the elastic body, at least one support member is disposed in the contact surface side of the electromechanical converting element, for supporting the elastic body. In the elastic body, by means of excitation of the electromechanical converting element, a first vibration mode vibrates within the annular shaped standard surface and flat surface. A second vibration mode, which is a bending vibration having one or more nodal circles and one or more nodal diameters, vibrates in a direction intersecting a standard plane. In the standard plane, a vibration which causes relative motion to be performed is caused to arise between the elastic body and the relative motion member. The at least one support member is located at an intersection point of the nodal circle and nodal diameter of the second vibration mode in the elastic body.

In the above embodiments, the standard plane can be considered as the junction plane of the elastic body and the electromechanical converting element.

Moreover, the electromechanical converting element can be formed by four respectively independently controlled fan shaped electromechanical converting elements.

Furthermore, the respective electromechanical converting elements are preferably established in positions which exclude the positions of the support members.

Also, the support members can be formed such that the elastic body is pressed towards the relative motion member.

Further, the first vibration mode can be considered as a vibration mode which causes the elastic body to displace in the direction in which the diameter of the annulus extends, and the intersection causes displacement in the direction in which the diameter contracts.

Moreover, the first vibration mode can be considered as a vibration mode which causes the elastic body to displace in a non-axisymmetric direction.

In the preferred embodiments of the present invention, the obstruction of the vibration of the elastic body can be suppressed by locating the support member of the elastic body on one or other of the two vibration nodes, i.e., the nodal circle and the nodal diameter.

Moreover, the obstruction of the vibration of the elastic body can be suppressed by locating the support member of the elastic body on an intersection point of the two vibration nodes, i.e., the nodal circle and the nodal diameter.

Moreover, it is possible to generate two-dimensional relative motion between the elastic body and the relative moving member by forming the electromechanical converting element of four fan-shaped electromechanical converting elements which are respectively independently controlled.

Furthermore, in an embodiment wherein the elastic body has electrical conductivity, short circuits can be prevented by locating the respective electromechanical converting elements in positions which exclude the positions of the support members.

Also, the support members can function both as support members and as pressure mechanisms, by being formed so as to press the elastic body towards the relative motion member.

Moreover, when the first vibration mode is considered as a vibration mode which causes the elastic body to displace in the direction in which the diameter extends, and the direction in which the diameter contracts, the elastic body by means of this first vibration mode (stretching vibration) and second vibration mode (a two-dimensional bending vibration having one or more nodal circles and one or more nodal diameters), generates a drive force which causes the generation of the relative motion.

Moreover, when the first vibration mode is considered as a vibration mode which causes the elastic body to displace in a non-axisymmetric direction, the elastic body by means of this first vibration mode (non-axisymmetric vibration) and second vibration mode (a two-dimensional bending vibration having one or more nodal circles and one or more nodal diameters), generates a drive force which causes the generation of the relative motion.

Additional objects and advantages of the invention will be set forth in part in the description which follows and, in part, will be obvious from the description, or may be learned by practice of the invention.

BRIEF DESCRIPTION OF THE DRAWINGS

These and other objects and advantages of the invention will become apparent, as will methods of use and manufacture, from the following detailed description of the preferred embodiments, taken in conjunction with the drawings, all of which form a part of this specification. In the drawings:

FIGS. 15(A)–15(E) are diagrams which illustrate the operation of the vibration actuator in the third embodiment of the present invention;

DESCRIPTION OF THE PREFERRED EMBODIMENTS

Figure 1A:
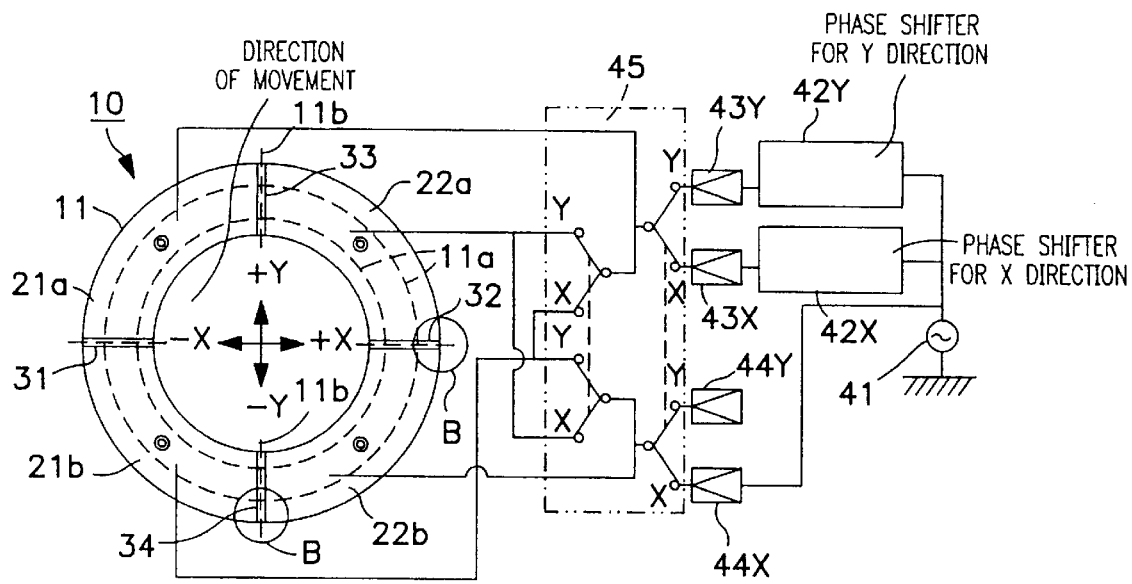
FIGS. 1(A) and 1(B) are schematic diagrams showing the vibration actuator body for a vibration actuator according to a first embodiment of the present invention.

Reference will now made in detail to the present preferred embodiments of the present invention, examples of which are illustrated in the accompanying drawings, wherein like reference numerals refer to like elements throughout.

First Embodiment

Figure 1B:
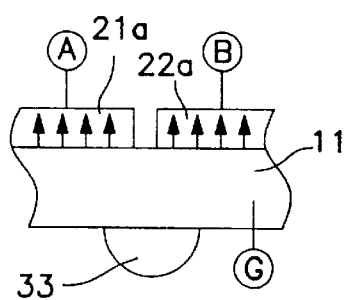
Figure 2:
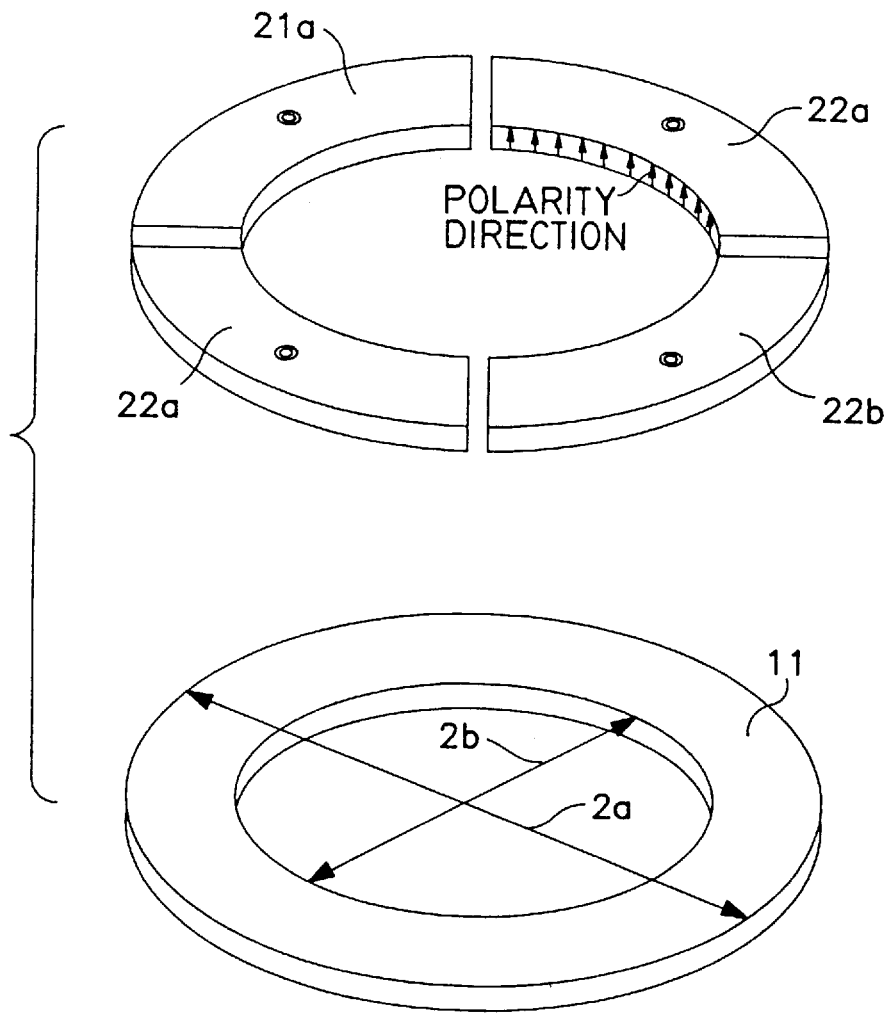
FIG. 2 is an oblique drawing showing an elastic body and a piezo-electric element for the vibration actuator in the first embodiment shown in FIGS. 1(A) and 1(B)
Figure 3:
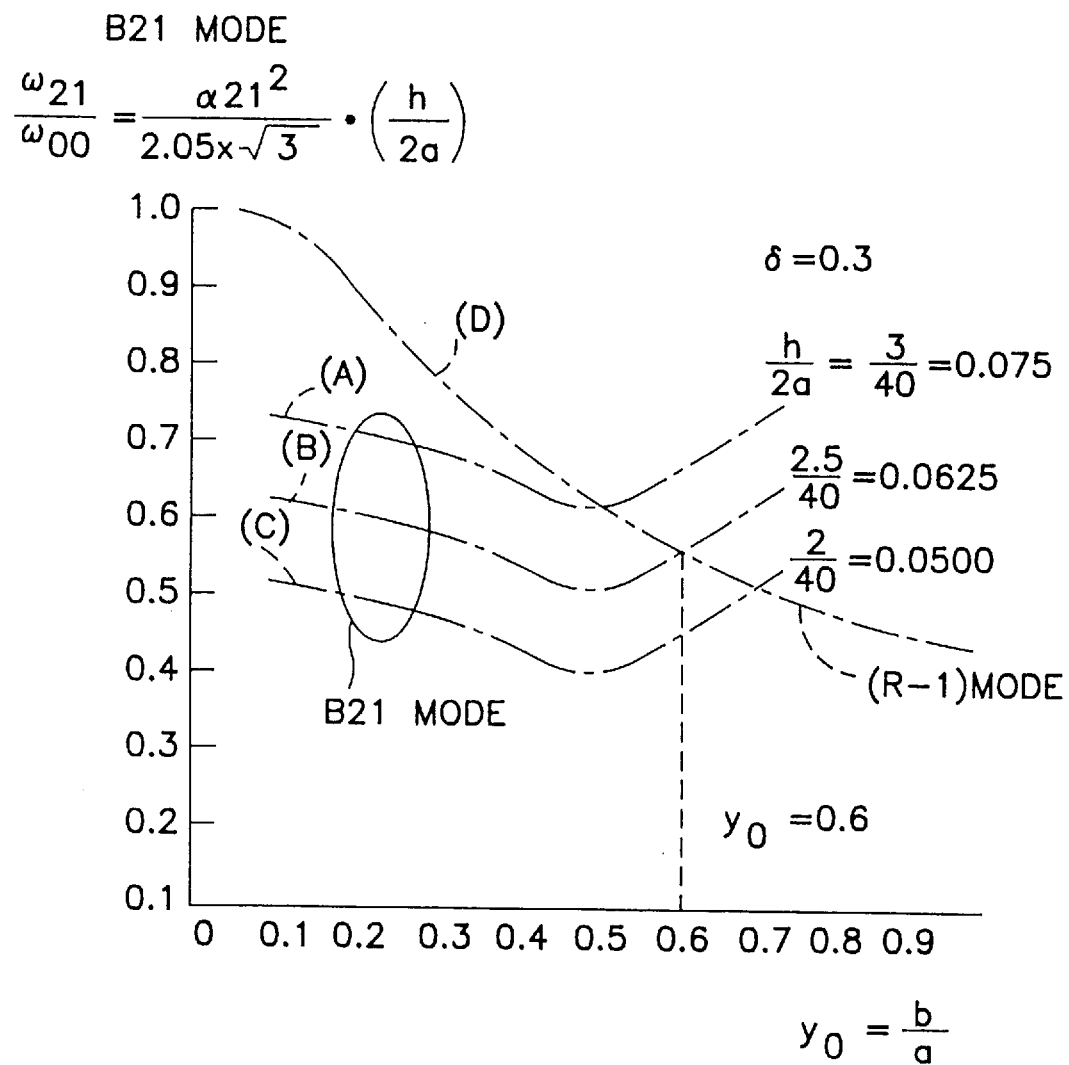
FIG. 3 is a graph which describes the elastic body in the first embodiment.

FIGS. 1–5 are diagrams showing the vibration actuator body used in the vibration actuator of the first embodiment. FIGS. 1(A) and 1(B) are schematic diagrams showing the construction of the vibration actuator body. FIG. 2 is an oblique diagram showing the elastic body and the piezoelectric element. FIG. 3 is a graph which describes the elastic body in the first embodiment. FIGS. 4(A)–4(D) are drawings which illustrate the drive force output member in the first embodiment. FIGS. 5(A)–5(D) are diagrams which illustrate the operation of the first embodiment.

In the first embodiment, a vibration actuator 10 has an elastic body 11 which causes the generation of the combined vibration of the first vibration mode and the second vibration mode. The elastic body in which the (R–1)- $B_{21}$ mode arises has been shown. Here the first vibration mode is a mode which vibrates in a plane parallel to the standard plane which forms the annular shape of the elastic body. Moreover, this first vibration mode also becomes a vibration mode in a plane parallel to the junction plane which joins the elastic body and an electromechanical converting element. Moreover, the second vibration mode is a bending mode of nodal circle number m, nodal diameter number n, and amplitudes arising in the direction intersecting the standard plane. Here m and n denote arbitrary natural numbers.

The vibration actuator 10 comprises the elastic body 11 formed in an annular shape, and four piezoelectric elements 21a, 21b, 22a, 22b which are the electromechanical converting element, and four drive force output members 31–34 which are formed in projecting forms in the lower surface of the elastic body 11. The piezoelectric elements 21a, 21b, 22a, 22b are joined to the elastic body 11 by adhesive, for example.

The elastic body 11, as shown in FIG. 2, is an annular elastic member, and is made of metal, plastic, or the like.

The elastic body 11, as shown in FIG. 3, by setting the dimensions of the annulus, a stretching and contracting vibration ((R–1) mode: vibration in a direction in which a diameter stretches, and a direction in which a diameter contracts, in some plane) which is a first mode, and a bending vibration ($B_{21}$ mode, of nodal circle number 2 and nodal diameter number 1) can be caused to coincide. In the first embodiment, it is effected by adjusting the diameter 2b of the inside hole of the elastic body 11.

The abscissa of FIG. 3 shows the ratio y=b/a of the outer diameter 2a and the inner diameter 2b of the elastic body 11 shown in FIG. 2. In FIG. 3, the hole is not open at the position where 2b=0, and the hole becomes large when 2b approaches 1.

Moreover, the ordinate shows the ratio of the resonant frequency $\omega_{00}$ of the (R–1) mode with respect to the resonant frequency $\omega_{21}$ of the $B_{21}$ mode. Then the graph shows $$\omega_{21}/\omega_{00} = \{\alpha_{21}{}^2/[2.05 \cdot (3)^{1/3}]\} \cdot (h/2a)$$

Here the curve (D) in FIG. 3 shows the (R–1) mode. Moreover, the curves (A), (B) and (C) show the $B_{21}$ mode, where the values of h (plate thickness of the annulus)/2a (outer diameter of the annulus) have been made to differ, as 3/40, 2.5/40, and 2/40.

As is clear from FIG. 3, in the case that the plate thickness h=2.5 mm and the outer diameter 2a=40 mm, the configuration becomes that of curve (B), and degeneracy is possible at y=0.6.

Figure 4A:
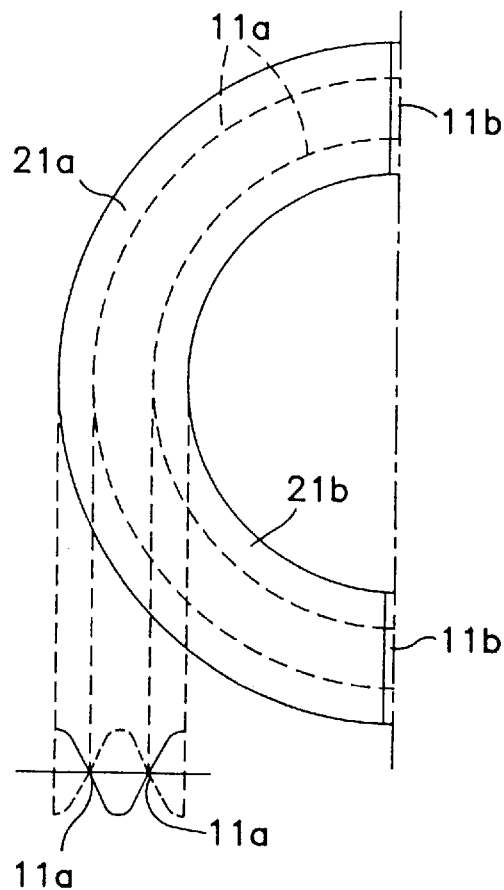
FIGS. 4(A)–4(D) are drawings which illustrate the drive force output member in the first embodiment.
Figure 4B:
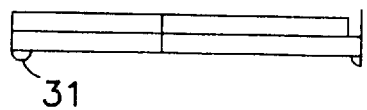
Figure 4C:
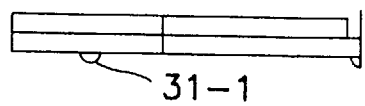
Figure 4D:
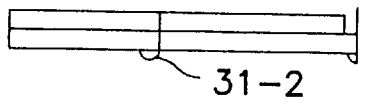

In this embodiment, the case will be described in which degeneracy is caused in the (R–1) mode (the first vibration mode) and the $B_{21}$ mode (the second vibration mode). The nodal circle 11*a* and nodal diameter 11*b* when in the (R–1)–$B_{21}$ mode are shown in FIG. 1(A) and FIG. 4(A).

The piezoelectric elements 21*a*, 21*b*, 22*a*, 22*b* are respectively formed, as shown in FIG. 2, as quarters (¼) of a circle, and are formed of PZT and the like. The piezoelectric elements 21*a*, 21*b*, 22*a*, 22*b* are polarized as shown in FIG. 1(B). High frequency voltages A, B of two phases are impressed upon the piezoelectric elements.

Drive force output members 31–34 are disposed, in the form of projections, in a plane of the elastic body 11 apart from the piezoelectric elements. The drive force output members 31–34 are portions which extract the elliptic motion which arises due to the combined vibration of the bending vibration and the stretching and contracting vibration of the elastic body 11. These members 31–34, while contacting the relative movement member, cause relative movement of the elastic member 11.

The drive force output members 31–34, as shown in FIG. 1(A), are disposed on the lower surface of the elastic body 11, and also at four places, 90° apart, on its outer periphery. In order to increase the wear resistance of the drive force output members 31–34, spherical bodies formed of silicon nitride or the like are mounted on their tips. It is desirable to locate these drive force output members 31–34 so as to avoid positions which become nodes of a bending vibration, in order to output the drive force with good efficiency. It is preferable for the members 31–34 to be in positions of antinodes of the bending vibration mode of an approximately perpendicular direction with respect to the plane of movement, such as the drive force output members shown in FIGS. 4(B) as 31, in 4(C) as 31-1 and in 4(D) as 31-2.

This vibration actuator 10, as shown in FIG. 1(B), by means of impressing high frequency voltages A, B on the four piezoelectric elements 21*a*, 21*b*, 22*a*, 22*b*, gives rise to a complex vibration of the bending vibration and the extension and contraction vibration. By this means, an elliptic motion is caused to arise at the tips of the drive output members 31 and 32, causing a drive force to arise. Here the symbol G is a ground (electric ground potential). The direction of polarization of the four piezoelectric elements 21*a*, 21*b*, 22*a*, 22*b* is such that the polarities become mutually in the same direction. Moreover, the high frequency voltages A, B have a time phase difference of $\pi/2$. Moreover, the direction of polarization of the four piezoelectric elements 21*a*, 21*b*, 22*a*, 22*b* may be in mutually opposed directions, according to the polarities of the impressed high frequency voltages.

In FIG. 1(A), an oscillator 41 generates a high frequency signal. The high frequency signal from the oscillator 41 is branched into a first signal and a second signal. One signal (the first signal) is further branched and is respectively input to a phase shifter 42X for the X direction and a phase shifter 42Y for the Y direction. The high frequency signal which has been phase shifted in time by $\pi/2$ by means of the phase shifter 42X for the X direction is then connected to an amplifier 43X for the X direction. Moreover, the high frequency signal which has been phase shifted by $\pi/2$ by means of the phase shifter 42Y for the Y direction is connected to an amplifier 43Y for the Y direction.

In contrast to this, the other high frequency signal (the second signal) is further branched, and respectively directly connected to the amplifier 44X for the X direction and the amplifier 44Y for the Y direction.

Each amplifier 43X, 43Y, 44X, 44Y is connected to a respective piezoelectric element 21*a*, 21*b*, 22*a*, 22*b* via electrode plates (not shown) and via a changeover switch 45.

When the connection points of the changeover switch 45 are all changed over to the X side (the state shown by the broken lines of FIG. 1(A)), the output of the amplifier 43X is connected to the elements 21*a*, 21*b*. Moreover, the output of the amplifier 44X is connected to the elements 22*a*, 22*b*. Accordingly, the left-hand side electrode plates 21*a*, 21*b* are grouped, and in addition the right-hand side electrodes 22*a*, 22*b* are grouped. Accordingly, a high frequency voltage A is impressed upon piezoelectric elements 21*a*, 21*b* and a high frequency voltage B is impressed upon piezoelectric elements 22*a*, 22*b* (or the reverse of this relationship). As a result, the elastic body 11 becomes capable of movement in the X direction.

Similarly, when the connection points of the changeover switch 45 are all changed over to the Y side (the state shown by the full lines of FIG. 1(A)), the output of the amplifier 43Y is connected to the elements 21*a*, 22*a*. Moreover, the output of the amplifier 44Y is connected to the elements 21*b*, 22*b*. Accordingly, the upper side electrode plates 21*a*, 22*a* are grouped, and in addition the lower side electrodes 21*b*, 22*b* are grouped. Accordingly, a high frequency voltage A is impressed upon piezoelectric elements 21*a*, 22*a* and a high frequency voltage B is impressed upon piezoelectric elements 21*b*, 22*b* (or the reverse of this relationship). As a result, the elastic body 11 becomes capable of movement in the Y direction.

Figure 5D:
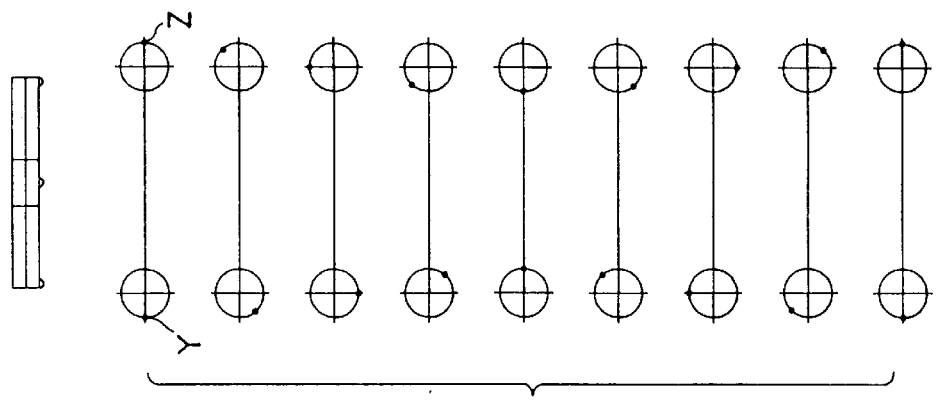
FIGS. 5(A)–5(D) are diagrams which illustrate the operation of the first embodiment.
Figure 5C:
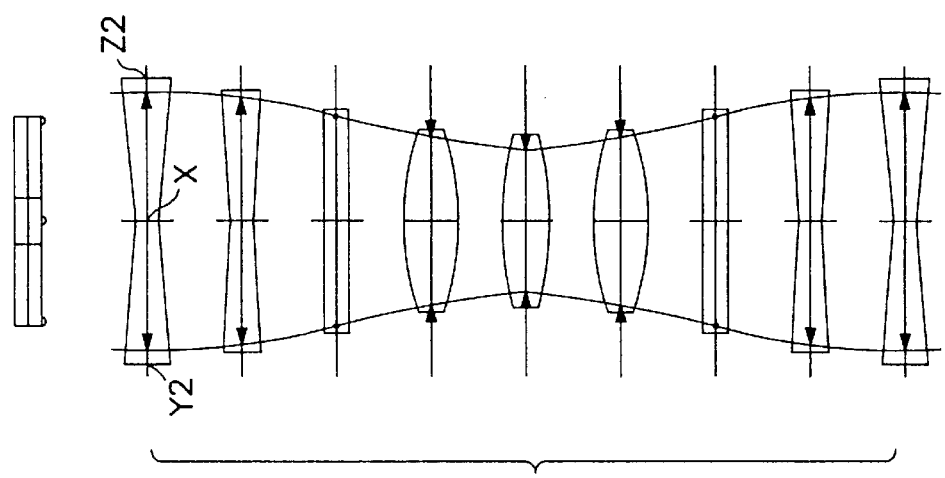
Figure 5B:
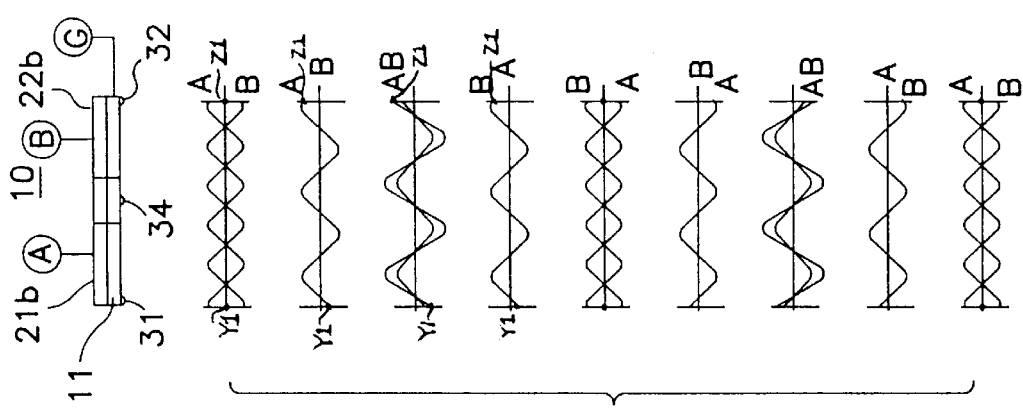
Figure 5A:
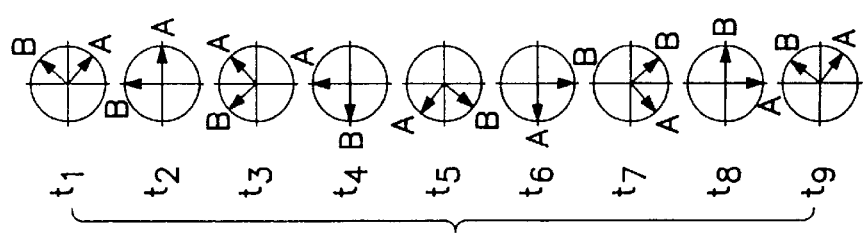

FIG. 5(A) shows the time changes from time $t_1$ to time $t_9$ of the high frequency voltages A, B of two phases, input to the vibration actuator 10. The horizontal axis shows the effective value of the high frequency voltage. The right-hand side of the vertical axis is the extension direction of the extension and contraction vibration; the left-hand side is the contraction direction of the extension and contraction vibration.

FIG. 5(B) shows the time changes from time $t_1$ to time $t_9$ of the bending vibration which arises in the vibration actuator, showing the kinds of displacement of the cross sectional surface of the vibration actuator. FIG. 5(C) shows the time changes (time $t_1$–time $t_9$) of the expansion and contraction vibration arising in the vibration actuator, showing the kinds of displacement of the cross section of the vibration actuator. FIG. 5(D) shows the time changes (time $t_1$–time $t_9$) of the elliptic motion which arises in the drive force output members 31, 32 of the vibration actuator.

The operation of the vibration actuator 10 of this embodiment example will next be described for time $t_1$ through time $t_9$. Moreover, for convenience of description, the situation will be described for movement in the X direction as shown in FIG. 5. However, the situation is completely similar for the Y direction.

At time $t_1$, as shown in FIG. 5(A), a positive voltage of the high frequency voltage A occurs, and similarly the same positive voltage of the high frequency voltage B occurs. As shown in FIG. 5(B), the bending vibrations due to the high frequency voltages A, B combine and mutually cancel, and the material point Y1 and the material point Z1 both have amplitude 0. Moreover, as shown in FIG. 5(C), the expansion and contraction vibration due to the high frequency voltages A, B occurs in the expansion direction. The material point Y2 and the material point Z2, as shown by the arrows, have a maximum expansion with the node X as the center. As a result, as shown in FIG. 5(D), the two amplitudes are compounded, and the combined motion of the material point Y1 and the material point Y2 becomes the motion of the material point Y; moreover, the combined motion of the material point Z1 and the material point Z2 becomes the motion of the material point Z.

At time $t_2$, as shown in FIG. 5(A), the high frequency voltage B becomes 0, and the high frequency voltage A occurs as a positive voltage. As shown in FIG. 5(B), a bending vibration arises due to the high frequency voltage A, the material point Y1 oscillates in the negative direction, the material point Z1 oscillates in the positive direction. Moreover, as shown in FIG. 5(C), an expansion and contraction motion occurs due to the high frequency voltage A. The material point Y2 and the material point Z2 contract more than at time $t_1$. As a result, as shown in FIG. 5(D), the above two vibrations are compounded, and the material points Y and Z move around to the left more than at time $t_1$.

At time $t_3$, as shown in FIG. 5(A), the high frequency voltage A occurs as a positive voltage. Similarly, the high frequency voltage B occurs as the same negative voltage. Then as shown in FIG. 5(B), the bending vibrations due to the high frequency voltages A, B combine and are amplified. Because of this, the material point Y1 oscillates in the negative direction more than at time $t_2$, and shows a maximum negative oscillation value. The material point Z1 oscillates in a positive direction more than at time $t_2$, and shows a maximum positive oscillation value. Moreover, as shown in FIG. 5(C), the expansion and contraction motions due to the high frequency voltages A, B combine to mutually cancel, and the material points Y2 and Z2 return to their original positions. As a result, as shown in FIG. 5(D), by the compounding of the two motions, the material points Y and Z move more counter-clockwise than at time $t_2$.

At time $t_4$, as shown in FIG. 5(A), the high frequency voltage A becomes 0, and the high frequency voltage B arises as a negative voltage. As shown in FIG. 5(B), a bending motion arises due to the high frequency voltage B, and the amplitude of the material point Y1 decreases from its value at time $t_3$. Because of this, the amplitude of the material point Z1 decreases from its value at time $t_3$. Moreover, as shown in FIG. 5(C), the expansion and contraction motion occurs, due to the high frequency voltage B, and the material points Y2 and Z2 contract. As a result, as shown in FIG. 5(D), the two vibrations are compounded, and the material points Y and Z move further counter-clockwise than at time $t_3$.

At time $t_5$, as shown in FIG. 5(A), the high frequency voltage A occurs as a negative voltage; similarly, the high frequency voltage B occurs as the same negative voltage. As shown in FIG. 5(B), the bending vibrations due to the high frequency voltages A, B combine and mutually cancel, and the amplitude of the material points Y1 and Z1 becomes 0. Moreover, as shown in FIG. 5(C), the expansion and contraction motion due to the high frequency voltages A, B occurs in the direction of contraction. As a result, as shown in FIG. 5(D), the two vibrations are compounded, and the material points Y and Z move further counter-clockwise than at time $t_4$.

According to the changes in times $t_6$–$t_9$, bending and expansion and contraction vibrations arise according to similar principles, and as a result, as shown in FIG. 5(D), the material points Y and Z move counter-clockwise, and perform an elliptical motion.

By means of the above principles, vibration actuator 10 causes the occurrence of an elliptical motion at the tips of the drive force output members 31, 32, and gives rise to the occurrence of a drive force. Accordingly, the elastic body 11 is self-propelled with respect to the fixed portion, when the tips of the drive force output members 31, 32 are pressed onto the fixed unit which is the relative motion member.

The contact position of the support member to the elastic body will next be described for the first embodiment.

Figure 6:
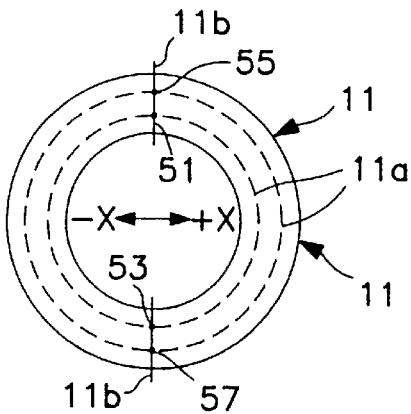
FIG. 6 is a plan view showing the positions of the nodal circle and nodal diameter, and the intersection points of the circle and diameter, which arise in the elastic body in the case of driving the vibration actuator of the first embodiment in the X direction.

FIG. 6 is a plan view showing, in the case of driving the vibration actuator 10 in the X direction, the positions occurring in the elastic body 11 of the node circles 11a and the node diameter 11b of the $B_{21}$ mode, and the intersection points 51, 53, 55, and 57 of the two nodes. This $B_{21}$ mode is a bending vibration mode of nodal circle number 2, nodal diameter number 1.

Figure 7:
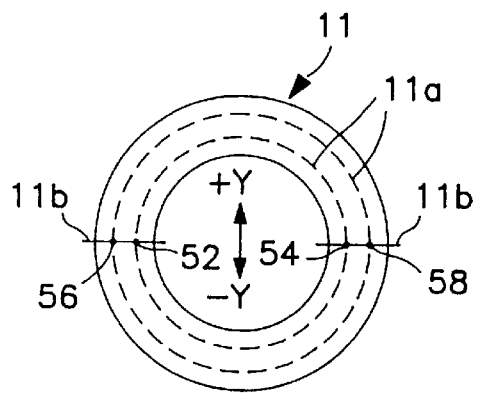
FIG. 7 is a plan view showing the positions of the nodal circle and nodal diameter, and the intersection points of the circle and diameter, which arise in the elastic body in the case of driving the vibration actuator of the first embodiment in the Y direction.

On the other hand, FIG. 7 is a plan view showing, in the case of driving this vibration actuator 10 in the Y direction, the positions occurring in the elastic body 11 of the node circles 11a and the node diameter 11b of the $B_{21}$ mode, and the intersection points 52, 54, 56, and 58 of the two nodes. This $B_{21}$ mode, as mentioned above, is a bending vibration mode of nodal circle number 2, nodal diameter number 1.

Figure 8:
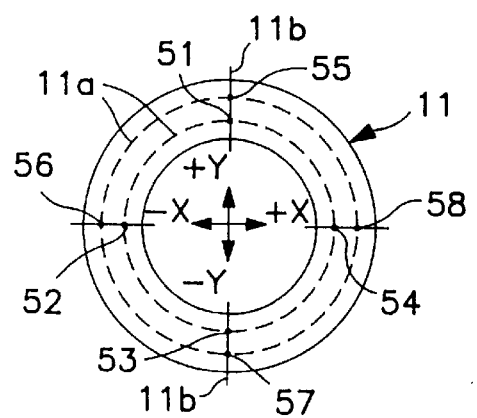
FIG. 8 is a plan view showing the positions of the nodal circle and nodal diameter, and the intersection points of the circle and diameter, all displayed superposed for both X and Y vibrations.

Furthermore, FIG. 8 is a plan view in which these node circles 11a, the node diameter 11b, and the intersection points 51–58 of the two nodes are all shown superposed. Moreover, the intersection points 51–58 are not simultaneously present. The intersection points 51, 53, 55 and 57 are manifested during driving in the X direction, and the intersection points 52, 54, 56 and 58 are manifested during driving in the Y direction.

Because these nodal circles 11a, nodal diameter 11b and intersection points 51–58 comprise the nodes of the bending vibration mode, obstruction of vibration occurring in the elastic body 11 can be suppressed as far as possible by performing support at these positions.

Moreover, in FIG. 8, it is desirable to select support positions uniformly from the positions marked with circles in the Figure, that is, on the intersection points 51, 53, 55 and 57 of the nodal circles 11a and the nodal diameter 11b during driving in the X direction, and on the intersection points 52, 54, 56 and 58 of the nodal circles 11a and the nodal diameter 11b during driving in the Y direction. The difference due to drive direction can be eliminated by making the supports uniform with respect to the X direction and the Y direction respectively. For example, it is desirable to select the intersection points 51, 52, 53 and 54, or the nodal points 51, 52, 53, 54, 55, 56, 57 and 58, as support positions.

Figure 9:
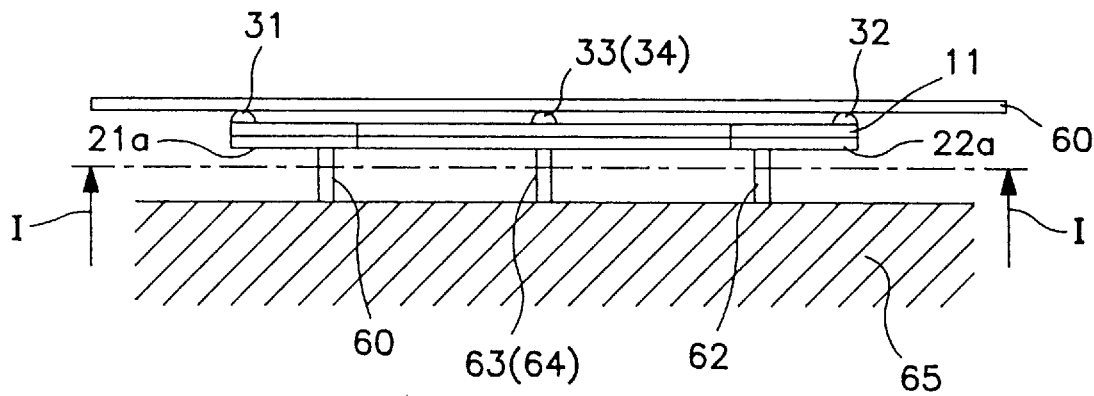
FIG. 9 is a vertical cross-sectional view showing the location of a support rod which supports the elastic body, in the vibration actuator of the first embodiment.
Figure 10:
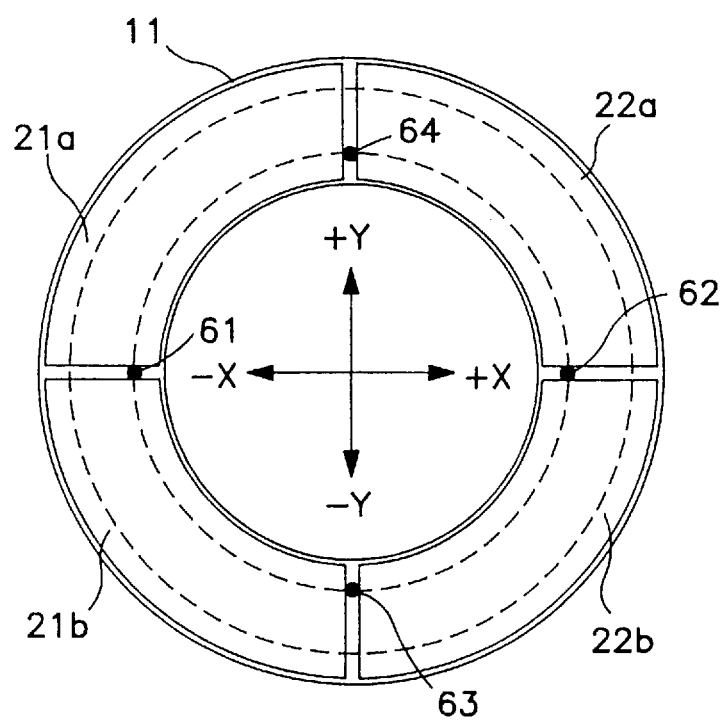
FIG. 10 is a cross-sectional view taken along the line I—I of FIG. 9.

FIG. 9 is a vertical cross-sectional view which shows the establishment situation of support rods which support the elastic body in the present embodiment. FIG. 10 is a cross-sectional along lines I—I in FIG. 9.

As shown in FIGS. 9 and 10, support rods 61–64, directed downwards in the drawing, are disposed on the junction surface side of the four piezoelectric elements 21a, 21b, 22a, 22b joined to the elastic body 11. The support rods 61–64, as shown in FIG. 10, are set up between the respective four quarter piezoelectric elements 21a–22b. In the case that the support rods 61–64 have electrical conductivity, they are established such that they do not contact the piezoelectric elements 21a–22b, in order to prevent short circuits. The respective other ends of the support rods 61–64 are established directed at right angles with respect to fixed surface 65.

The tips of the drive force output members 31–34, which have been disposed on the other surface of the elastic body 11 supported by the support rods 61–64, make contact with drive object 60.

By impressing on the piezoelectric elements 21a, 21b, 22a, 22b drive voltages from a drive source (not shown in the drawing), an extension and contraction motion ((R–1) mode: a stretching and contraction in the surface direction) and a second order bending vibration ($B_{21}$, mode), which is the second vibration mode, are generated and degeneracy occurs. As a result, an elliptical motion is generated by the drive force output units 31–34, and relative motion arises between the elastic body 11 and the driven object 60.

During this relative motion, the elastic body 11 is supported by means of the support rods at nodal positions of the $B_{21}$ mode, and obstruction of the vibration can be suppressed as far as possible. Because of this, a high drive efficiency is obtained.

Moreover, in the present embodiment example, a $R_S$–$B_{mn}$ type vibration actuator has been used which utilizes a second order bending vibration nodal circle number 2, nodal diameter number 1. Embodiments of the present invention, however are not limited to the case of nodal circle number 2, nodal diameter number 1. A $R_S$–$B_{mn}$ type vibration actuator which uses a stretching vibration as the first vibration mode and a second order bending vibration as the second order mode can be equally applied with regard to a vibration actuator which supports in nodal positions of this second order bending vibration.

Second Embodiment

Figure 11:
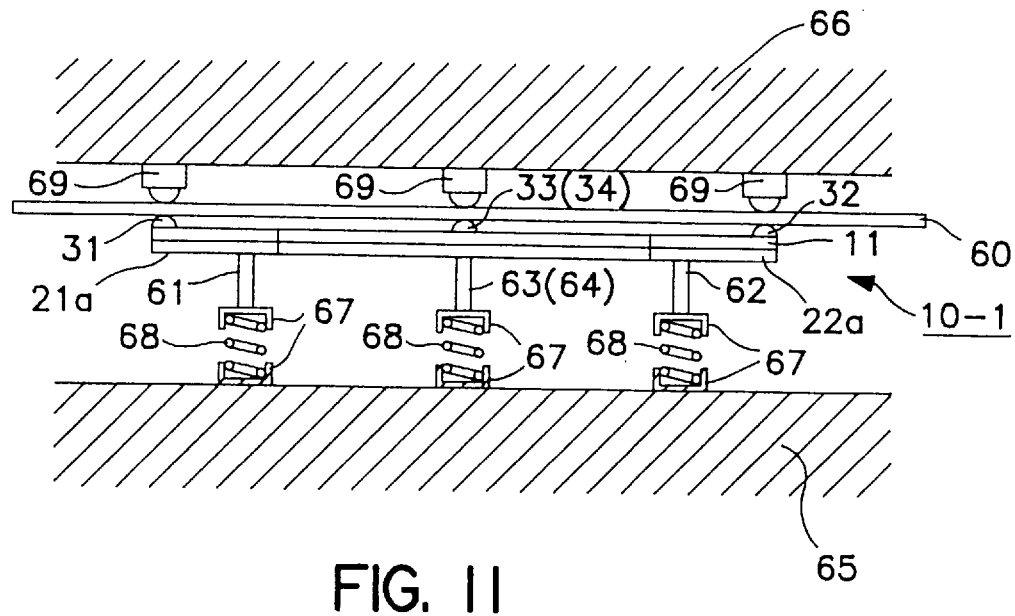
FIG. 11 is a cross-sectional view showing a vibration actuator according to a second embodiment of the present invention.

FIG. 11 is a cross-sectional view of a second embodiment of the vibration actuator shown in FIGS. 9 and 10, but having different support members. Therefore, for the elements and operations which are the same as in the vibration actuator shown in FIGS. 9 and 10, the same reference numerals are used and descriptions thereof are suitably omitted.

In a vibration actuator 10-1 as shown in FIG. 11, the support members 61–64 are not mounted directly to the fixed surface 65, but are mounted via pressurizing springs 68 which are retained by oppositely located pairs of pressurizing spring retaining frames 67. These support members 61–64 also serve to adjust the pressure force while pressing the elastic body 11 onto the driven object 60.

Pressurized object support pedestals 69, which are processed into tips of a spherical shape, are disposed on a fixed surface 66, guide the drive direction of the driven object 60, and in addition reduce as far as possible the sliding resistance when driving. Moreover, these pressurized object support pedestals 69 guide the driven object 60.

By the above construction, it becomes unnecessary to use a pressing mechanism other than the support members 61–64. Thus, the structure can be simplified. Moreover, the driven object 60 can be reliably conveyed.

Third Embodiment

Figure 12A:
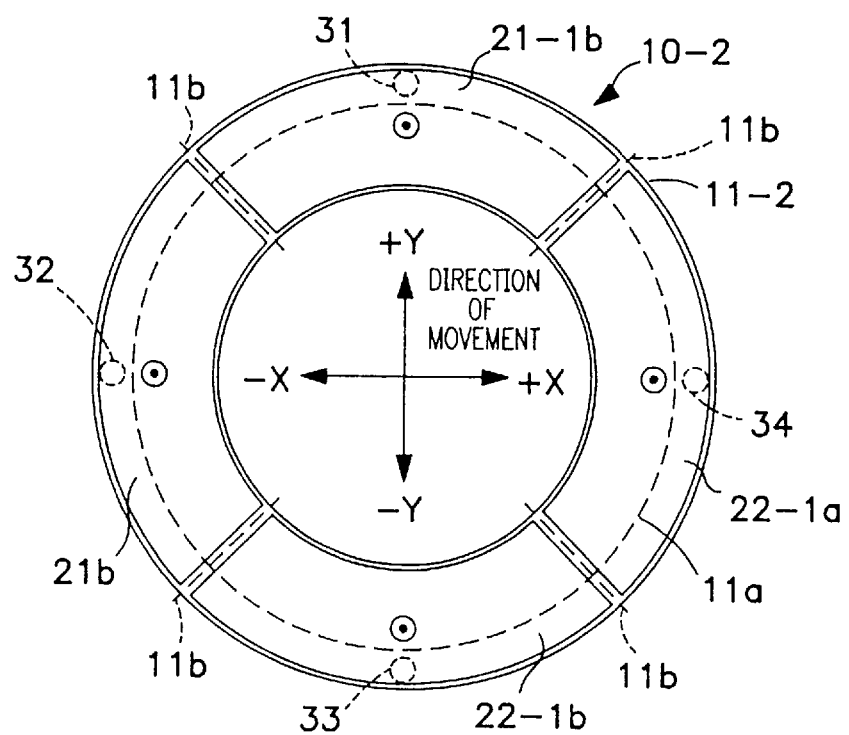
FIG. 12(A) is a front view showing the construction of a vibration actuator according to a third embodiment of the present invention.
Figure 12B:
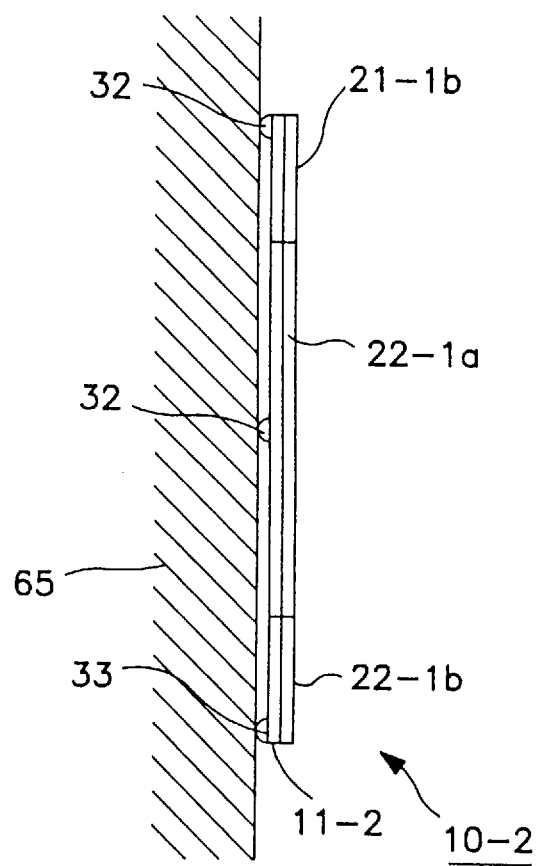
FIGS. 12(B) and 12(C) are side views together showing the construction of the third embodiment.
Figure 12C:
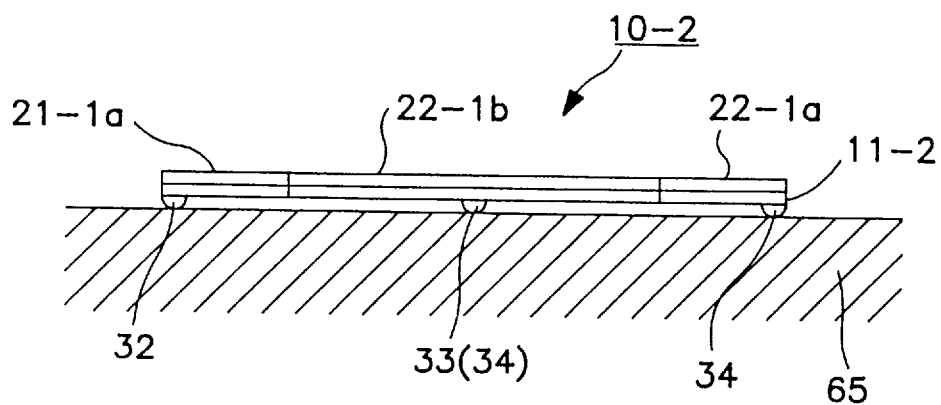
Figure 13:
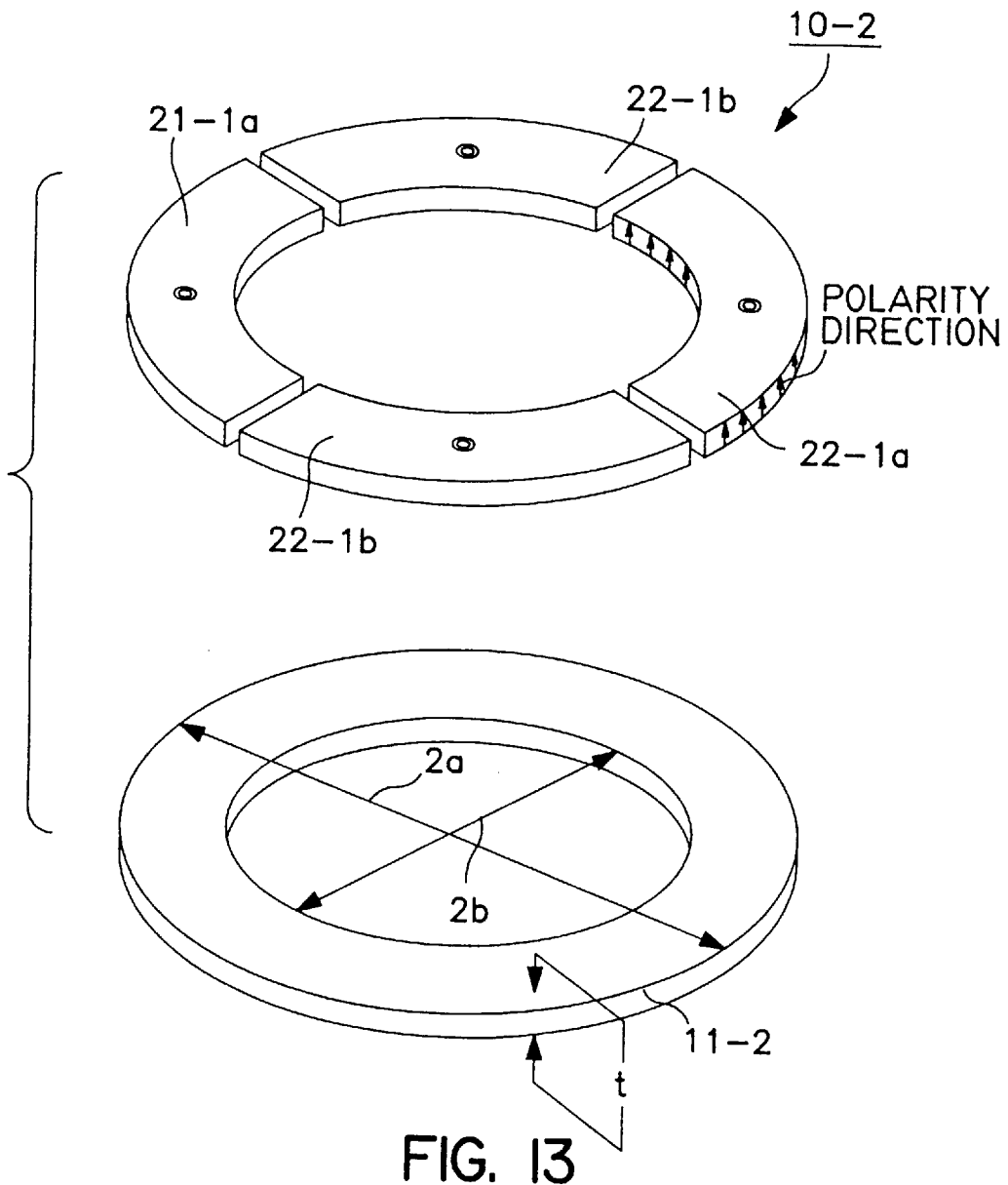
FIG. 13 is an oblique view showing the elastic body and piezoelectric element in the vibration actuator of the third embodiment.
Figure 14:
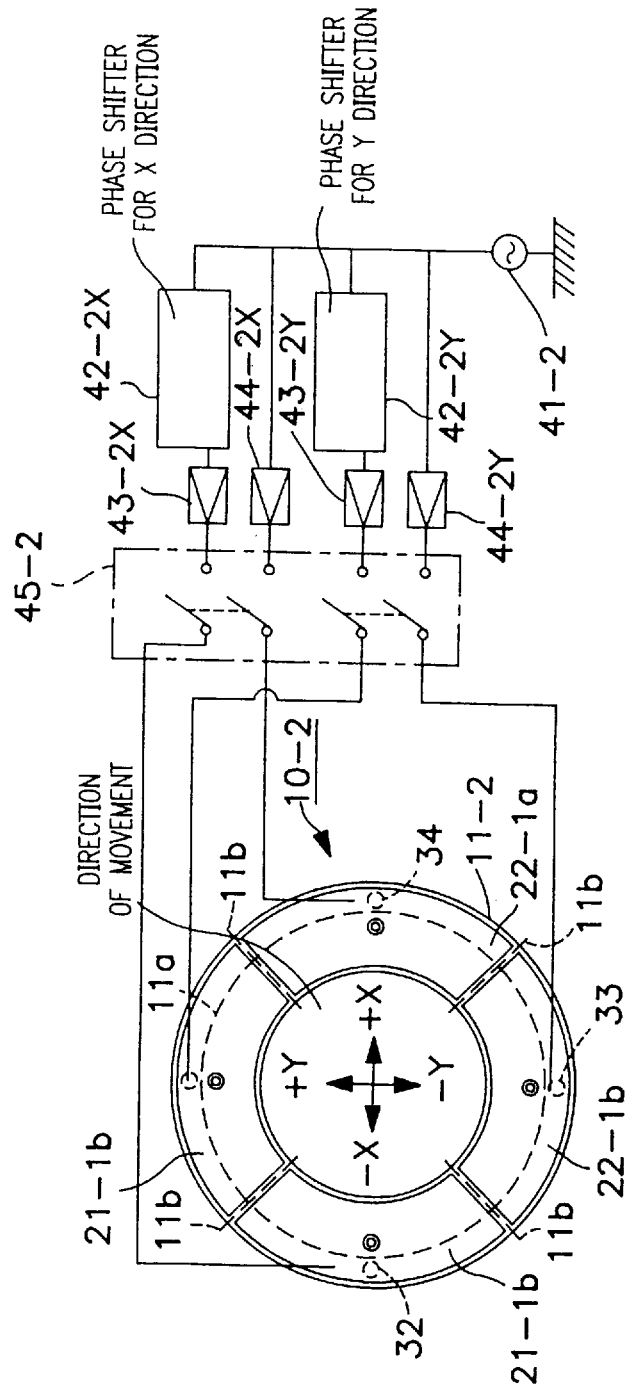
FIG. 14 is a front view showing a control circuit connected to the vibration actuator of the third embodiment.

FIGS. 12(A)–15(E) show a third embodiment of a vibration actuator according to the present invention. FIG. 12(A) is a front view showing the construction of the vibration actuator of this embodiment. FIGS. 12(B) and (C) are both side views showing the construction of the embodiment. FIG. 13 is an oblique view showing the elastic body and the piezoelectric elements of the vibration actuator. FIG. 14 is a front view showing a control circuit combined with the vibration actuator. FIGS. 15(A)–15(E) are diagrams describing the operation of the third embodiment.

The primary difference between the third embodiment and the first embodiment is that the vibration actuator which is used is of the ((N, M))–((N, M))'-$B_{mn}$ type, and not the $R_S$–$B_{mn}$ type. Consequently, when describing in detail the vibration actuator used in the present embodiment, the description of features which are in common with earlier embodiments is omitted.

A vibration actuator 10-2 of the present embodiment is formed of an elastic body 11-2 of annular shape, four piezoelectric elements 21-1a, 21-b, 22-1a, 22-1b which are electromechanical converting elements that have been joined to the upper surface of the elastic body 11-2, and four drive output members 31–34 which have been formed in a projecting shape on the lower surface of the elastic body 11-2. The piezoelectric elements 21-2a, 21-1b, 22-1a, 22-1b can, for example, be joined to the elastic body 11-2 by adhesion.

Moreover, in the present embodiment, all of the piezoelectric elements 21-1a, 21-1b, 22-1a, 22-1b are affixed to the same surface. However, the piezoelectric elements 21-1a and 21-1b, and the piezoelectric elements 22-1a and 22-1b, may be affixed to both surfaces of the elastic body.

The elastic body 11-2, as shown in FIG. 13, is an annular member, for example, made of metal or plastic or like elastic material.

The elastic body 11-2, as shown in FIG. 13, by setting the dimensions of the annulus (outer diameter: 2a, inner diameter: 2b, plate thickness: t), for example, in such a range as is mentioned later, a non-axisymmetric vibration {(1, 1))–((1, 1))' mode; vibration in a plane} which is the first vibration mode, and a second order bending vibration ($B_{12}$ mode) which is the second vibration mode, can be caused to coincide. In the case of a drive frequency f =40–60 kHz, by setting the dimensions as follows, the non-axisymmetric vibration {((1, 1))–((1, 1))' mode; vibration in a plane} and the second order bending vibration ($B_{12}$ mode) can be caused to coincide, and degeneracy becomes possible. Approximate dimensions are supplied below for the third embodiment.

Outer diameter 2a=40–50 mm

Plate thickness t=1.5–2.0 mm

Inner diameter 2b/outer diameter 2a=0.4–0.6

This first vibration mode is a vibration in a plane parallel to a standard plane which forms the annular shape of the elastic body 11-2. Moreover, this first vibration mode has also become a vibration mode in a plane which is parallel to the junction surface where the electromechanical converting elements have been joined to the elastic body. Moreover, the second vibration mode is a bending mode of nodal circle number m, nodal diameter number n, which arise in amplitudes in the intersecting direction in the aforementioned standard surface. Here m and n denote natural numbers.

In the present embodiment, describing the case in which the ((1, 1))–((1, 1))' mode and the $B_{12}$ mode are caused to coincide, the nodal circle 11a and the nodal diameters 11b of the $B_{12}$ mode at this time are shown by broken lines in FIG. 12(A).

The piezoelectric elements 21-1a, 21-1b, 22-1a, 22-1b, as shown in FIG. 13, are circular discs formed into quarters, and are made of PZT or the like. The piezoelectric elements 21-1a, 21-1b, 22-1a, 22-1b are polarized as shown in FIG. 13.

The drive force output members 31–34 output the elliptic motion generated by the combined movement of the non-axisymmetric vibration and the bending vibration of the elastic body 11-2. While in contact with the fixed member 65 (relative moving member), the drive force output members 31–34 perform relative motion with respect to the fixed member 65. The drive force output members 31–34, as shown in FIG. 12(C), are at the lower surface of the elastic body 11-2, and are disposed in four places at about 90° spacings, close to the outer edge of elastic body 11-2. The drive force output members 31–34, in order to increase the resistance to wear, include spherical bodies of silicon nitride or the like, mounted at the tips.

In particular, in the present embodiment, the drive output members 31–34, so as to obtain a uniform drive force with respect to both the X direction and the Y direction, are preferably at least partially spherical, elliptical, or the like curved surface body at their point of contact with the relative movement member.

Moreover, the piezoelectric elements 21-1a, 21-1b, 22-1a, 22-1b may be disposed on the same plane side as the drive force output members 31–34. In this case, when the drive force output members 31–34 have electrical conductivity, in order to prevent short circuits, it is desirable that the drive force output members 31–34 contact the surfaces of the piezoelectric elements 21-1a, 21-1b, 22-1a, 22-1b via insulating members.

These drive force output members 31–34, in order to output the drive force with good efficiency, are desirably disposed to avoid positions which become nodes of the bending vibration. For example, the drive force output members 31–34 shown in FIG. 12(A) are preferably positioned at an antinode of the up and down movement of the direction approximately perpendicular with respect to the plane of movement.

The vibration actuator 10-2 undergoes, by the application of high frequency voltages A, B to the four piezoelectric elements 21-1a, 21-1b, 22-1a, 22-1b, a compound motion of a non-axisymmetric vibration and a bending vibration. By this means, the generation of an elliptic motion of the tips of the drive force output members 31–34 is caused, thus generating a drive force. Moreover, the four piezoelectric elements 21-1a, 21-1b, 22-1a, 22-1b are polarized so that they become mutually polarized in the same direction. The high frequency voltages A and B have a phase difference in time of π/2. Moreover, the polarization of the four piezoelectric elements 21-1a, 21-1b, 22-1a, 22-1b may be in mutually opposite directions.

In FIG. 14, an oscillator 41-2 generates a high frequency signal. The high frequency signal output from the oscillator 41-2 is branched into four pieces. One branch is input to a phase shifter 42-2X for the X direction, and one branch to a phase shifter 42-4Y for the Y direction. These two signals after having been respectively phase shifted by the phase shifter 42-2X for the X direction and the phase shifter 42-2Y for the Y direction, are connected to the amplifier 43-2X for the X direction and the amplifier 43-2Y for the Y direction. Among the remaining two signals of the branches, one is directly connected to the amplifier 44-2X for the X direction, and the other is directly connected to the amplifier 44-2Y for the Y direction.

Each amplifier 43-2X, 43-2Y, 44-2X, 44-2Y, via a changeover switch 45-2, is respectively connected to a piezoelectric element 21-1a, 21-1b, 22-1a, 22-1b.

In the changeover switch 45-2, when the contact points, which are connected to the amplifier 43-2X for the X direction and to the amplifier 44-2X for the X direction, are in the ON state, the output of the amplifier 43-2X is connected to the piezoelectric element 21-1a, and the output of the amplifier 44-2X is connected to the piezoelectric element 22-1a. Accordingly, because the piezoelectric elements 21-1a and 22-1a are grouped facing each other in the X direction, the vibration actuator 10-2 becomes capable of a one-dimensional movement in the ±X direction. That is, a high frequency voltage A is impressed on the piezoelectric element 21-1a and a high frequency voltage B is impressed on the piezoelectric element 22-1a (or the reverse of this relationship).

Similarly, in the changeover switch 45-2, when the contact points, which are connected to the amplifier 43-2Y for the Y direction and to the amplifier 44-2Y for the Y direction, are in the ON state, the output of the amplifier 43-2Y is connected to the piezoelectric element 21-1b, and the output of the amplifier 44-2Y is connected to the piezoelectric element 22-1b. Accordingly, because the piezoelectric elements 21-1b and 22-1b are grouped facing each other in the Y direction, the vibration actuator 10-2 becomes capable of a one-dimensional movement in the ±Y direction. That is, a high frequency voltage A is impressed upon piezoelectric element 21-1b and a high frequency voltage B is impressed upon the piezoelectric element 22-1b (or the reverse of this relationship).

Figure 15E:
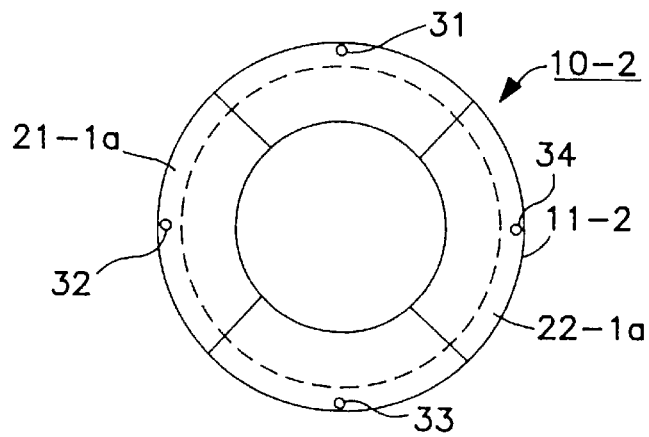

FIG. 15(A) shows the time change of the two phases of high frequency voltage A, B input to the vibration actuator 10-2 of FIG. 15(E) for time $t_1$ through time $t_9$. The horizontal axis of FIG. 15(A) shows the effective value of the high frequency voltage. The right-hand side of the vertical axis is the extension direction. The left-hand side is the contraction direction. FIG. 15(B) shows the time changes from time $t_1$ to time $t_9$ of the bending vibration which arises in the vibration actuator, showing the kinds of deformation of the side surface of the vibration actuator. FIG. 15(C) shows the time changes, for time $t_1$–time $t_9$, of the non-axisymmetric vibration arising in the vibration actuator, showing the kinds of deformation of the side surface of the vibration actuator. FIG. 15(D) shows the time changes, for time $t_1$–time $t_9$, of the elliptic motion in the material point X, the material point Y and the material point Z in the vibration actuator 10-2.

The operation of the vibration actuator 10-2 of this embodiment will next be described for time $t_1$ through time $t_9$.

At time $t_1$, as shown in FIG. 15(A), a positive voltage of the high frequency voltage A occurs, and similarly the same positive voltage of the high frequency voltage B occurs. As shown in FIG. 15(B), the bending vibrations due to the high frequency voltages A, B mutually combine to amplify so that the material point X1 and the material point Z1 both show the maximum negative amplitude, and the material point Y1 shows a maximum positive amplitude. As shown in FIG. 15(C), the amplitude of the non-axisymmetric vibration due to the high frequency voltages A, B is 0, and the respective amplitudes of the material point X2, the material point Y2 and the material point Z2, is 0. As a result, as shown in FIG. 15(D), the two amplitudes are compounded, and the combined motion of the material point Xi and the material point X2 becomes the motion of the material point X, the combined motion of the material point Y1 and the material point Y2 becomes the motion of the material point Y, and the combined motion of the material point Z1 and the material point Z2 becomes the motion of the material point Z.

At time $t_2$, as shown in FIG. 15(A), the high frequency voltage B becomes 0, and the high frequency voltage A occurs as a maximum positive voltage. As shown in FIG. 15(B), the amplitude of the bending vibration due to the high frequency voltage A decreases, and in addition, the amplitude of the bending vibration due to the high frequency voltage B becomes zero; the respective displacements of the material point X1, the material point Y1 and the material point Z1 decrease. As shown in FIG. 15(C), the amplitude of the non-axisymmetric motion occurs due to the high frequency voltage A. The material point X2 and the material point Z2 displace to the right-hand side in the FIG. 15(C) and in addition the material point Y2 displaces to the left-hand side. As a result, as shown in FIG. 15(D), the above two vibrations are compounded, and the material points X, Y and Z move counter-clockwise more than at time $t_1$, in an elliptic motion.

At time $t_3$, as shown in FIG. 15(A), the high frequency voltage A occurs as a positive voltage, and similarly the high frequency voltage B occurs as the same negative voltage. As shown in FIG. 15(B), the bending vibrations due to the high frequency voltages A, B combine and mutually cancel, the amplitude becoming 0. The respective displacements of the material point X1, the material point Y1 and the material point Z1 become 0. As shown in FIG. 15(C), by means of the non-axisymmetric vibration due to the high frequency voltages A, B, the material points X2 and Z2 have a maximum displacement further to the right in the Figure, and in addition the material point Y2 has a maximum displacement to the left in the Figure. As a result, as shown in FIG. 15(D), by the compounding of the two motions, the material points X, Y and Z move more counter-clockwise than at time $t_2$.

At time $t_4$, as shown in FIG. 15(A), the high frequency voltage A becomes 0, and the high frequency voltage B arises as a maximum negative voltage. As shown in FIG. 15(B), a bending motion arises due to the high frequency voltage B, and the respective displacements of the material point X1, the material point Y1 and the material point Z1 increase. As shown in FIG. 15(C), by means of the non-axisymmetric vibration due to the high frequency voltages A and B, the displacement to the right of the material point X2 and the material point Z2 decreases, and in addition the amount of displacement to the left of the material point Y2 decreases. As a result, as shown in FIG. 15(D), the two vibrations are compounded, and the material points X, Y and Z move further counter-clockwise than at time $t_3$.

At time $t_5$, as shown in FIG. 15(A), the high frequency voltage A occurs as a negative voltage, similarly the high frequency voltage B occurs as the same negative voltage. As shown in FIG. 15(B), the bending vibrations due to the high frequency voltages A, B mutually combine and amplify, and the material point X, the material point Y and the material point Z respectively become of maximum amplitude. As shown in FIG. 15(C), the amplitude of the non-axisymmetric motion due to the high frequency voltages A, B decreases, and the amounts of displacement of the material point X1, the material point Y1 and the material point Z1 all become 0. As a result, as shown in FIG. 15(D), the two vibrations are compounded, and the material point X, the material point y and the material point Z move more counter-clockwise than at time $t_4$.

According to the changes in times $t_6$–$t_9$, bending and non-axisymmetric vibrations arise by principles similar to those mentioned above, and as a result, as shown in FIG. 15(D), the material points X, Y and Z move counter-clockwise, and perform an elliptical motion.

By means of the above principles, the vibration actuator 10-2 causes the occurrence of an elliptical motion, as shown in FIG. 15(D), at the tips of the drive force output members 31–34, and gives rise to the occurrence of a drive force. Accordingly, the elastic body 11-2 is self-propelled with respect to the fixed member 65, when the respective tips of the drive force output members 31–34 are pressed onto the fixed member 65, which is the relative motion member.

Namely, in FIG. 15(D), at time $t_1$–time $t_3$, because the drive force output members 32 and 34 are in contact with elastic body 11-2 while performing an elliptic motion moving around to the left, the elastic body 11-2 moves to the left in the Figure.

At time $t_3$–time $t_7$, because the drive force output members 32 and 34 are in contact with elastic body 11-2 while performing an elliptic motion moving counter-clockwise, the elastic body 11-2 moves to the left in the Figure.

Furthermore, at time $t_7$–time $t_9$, because the drive force output members 31 and 33 are in contact with the elastic body 11-2 while performing an elliptic motion moving counter-clockwise, the elastic body 11-2 moves to the left in the Figure.

Thereafter, by the repetition of such operations, the elastic body 11-2 moves to the left as shown in the Figure.

Figure 16:
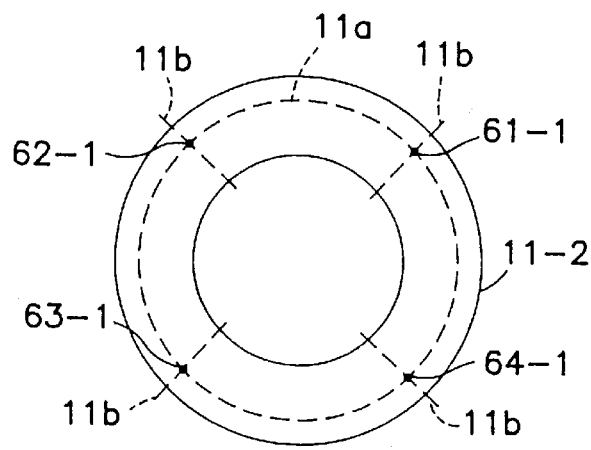
FIG. 16 is a plan view showing the positions of the nodal circle and nodal diameter, and the intersection points of the circle and diameter, of the two-dimensional bending vibration which arises in the elastic body excited when driving the vibration actuator of the third embodiment.

FIG. 16 is a plan view showing the nodal circle 11a and nodal diameters 11b of the second order bending vibration which is generated in the elastic body 11-2 when the vibration actuator 10-2 is driven, and the positions of intersection points 61-1, 62-1, 63-1 and 64-1 of the nodal circle 11a and nodal diameters 11b.

These intersection points 61-1, 62-1, 63-1 and 64-1 of the nodal circle 11a and nodal diameters 11b become the nodes of the bending vibration. Because of this, by performing support by causing support rods 61–64, as mentioned below, to contact the elastic body 11-2 at these locations, it can obstruct the vibration of the elastic body 11-2 as little as possible.

Figure 17:
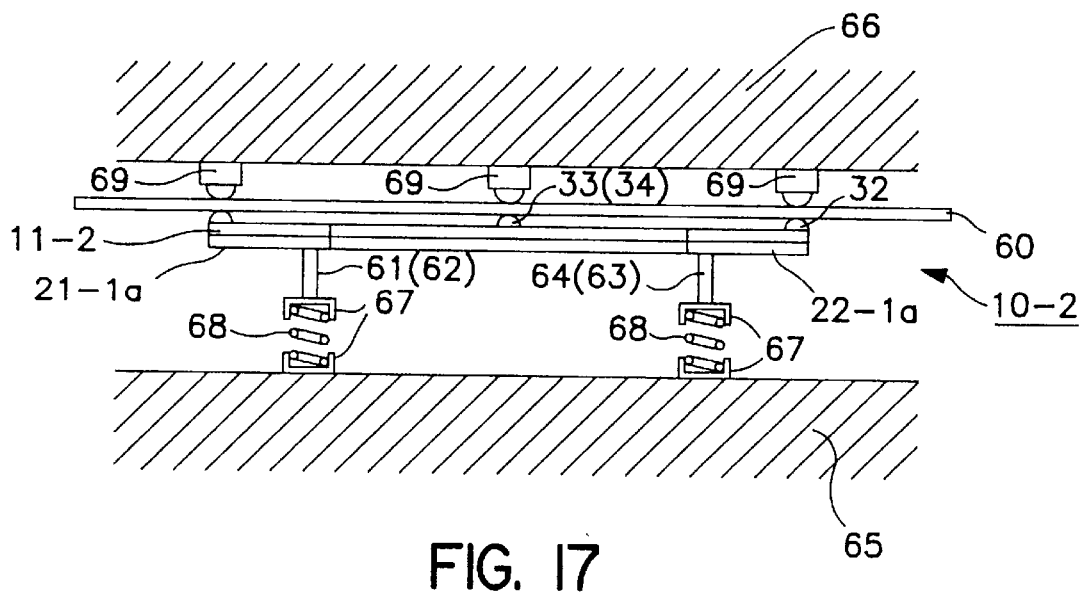
FIG. 17 is a cross-sectional view showing the vibration actuator of the third embodiment of the present invention.

FIG. 17 is a vertical cross-sectional view showing the arrangement of the support rods in this embodiment.

As shown in this Figure, support rods 61–64 are disposed in the junction surface sides of the four piezoelectric elements 21-1a, 21-1b, 22-1a, 22-1b joined to the elastic body 11-2. The support rods 61–64 are respectively arranged between the four piezoelectric elements 21-1a, 21-1b, 22-1a, 22-1b. Moreover, they are located so as not to come into contact with the piezoelectric elements 21-1a, 21-1b, 22-1a, 22-1b. The respective other ends of the support rods 61–64 are fixed to the fixed surface 65.

Furthermore, the drive output members 31–34 of the elastic body 11-2 which have been supported on the support rods 61–64, are in contact with the drive object 60, of a flat plate form, which is the relative motion member.

Then by impressing drive voltages from a drive source (not shown in the drawing) on the piezoelectric elements 21-1a, 21-1b, 22-1a, 22-1b, a non-axisymmetric vibration ((1, 1))–((1, 1))' mode, and a second order bending vibration ($B_{12}$ Mode), are generated and degeneracy occurs. As a result, an elliptic motion arises in the drive force output members 31–34, and relative motion is performed with respect to the drive object 60.

During this relative motion, the elastic body 11 is supported by means of the support rods 61–64 which are in nodal positions of the $B_{12}$ mode. Because of this, the obstruction of the vibration is suppressed as little as possible, and a high driving efficiency is obtained.

In this manner, it is possible to move one-dimensionally in a plane. For example, a vibration actuator 10-2 can be provided which can easily be inserted in a portion of circular cylindrical shape which is a lens barrel of a camera.

Moreover, in the present embodiment example, the vibration actuator which has been used is of the ((N, M))–((N, M)'-$B_{mn}$ type, which uses a second order bending vibration of nodal circle number 1 and nodal diameter number 2. However, embodiments of the present invention are not limited to the case of a nodal circle number 1, nodal diameter number 2. The support can be equally applied to a ((N, M))–((N, M)'-$B_{mn}$ type vibration actuator which uses a non-axisymmetric vibration and a second order bending vibration, in the nodal positions of the second order bending vibration.

The present invention is not limited to the embodiments described above. Various modifications and alterations are possible without departing from the scope of the present invention.

For example, piezoelectric elements have been used as the electromechanical converting elements in the description of the above embodiments. However, electrostrictive elements, magnetostrictive elements, and the like may alternatively be used.

Moreover, four piezoelectric elements have been joined to the elastic body, but in reality form one piezoelectric element in four portions. Drive signal input units (electrodes and the like) may be used in the four regions as shown in FIG. 1 and FIG. 14.

In the vibration actuator according to the above embodiments of the present invention, the elastic body of an annular form can be applied to the lens barrel, etc., of a camera, and is capable of being used as a drive source of a motion compensation device. However, the vibration actuator is also suitable for an XY stage used in a microscope, a transport device of a plotter paper apparatus, and other similar applications.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A vibration actuator comprising:
   a vibration member having an annular shaped, substantially flat elastic body;
   an electromechanical converting element joined to the elastic body;
   a relative motion member which is in pressure contact with the elastic body; and
   a plurality of support members that support the elastic body, wherein
      by excitation of the electromechanical converting element, a first vibration mode vibrating within the elastic body and vibrating in a direction parallel to a plane of the elastic body, and a second vibration mode which is a bending vibration having one or more nodal circles and one or more nodal diameters is caused to occur in the elastic body, and a vibration which causes relative motion to be performed is caused to arise between the elastic body and the relative motion member,
      the support members are disposed on at least one of the nodal circle and on the nodal diameter of the second vibration mode in the elastic body away from said center axis of said elastic body.

2. The vibration actuator as claimed in claim 1, further comprising a standard plane, which is the junction plane of the elastic body and the electromechanical converting element.

3. The vibration actuator as claimed in claim 1, wherein the electromechanical converting element includes four respectively independently controlled fan shaped electromechanical converting elements.

4. The vibration actuator as claimed in claim 3, wherein the respective electromechanical converting elements are established in positions which exclude positions of the support members.

5. The vibration actuator as claimed in claim 1, wherein the elastic body is pressed towards the relative motion member.

6. The vibration actuator as claimed in claim 1, wherein the first vibration mode is a vibration mode which causes the elastic body to displace in a direction in which a diameter of the elastic member extends and contracts.

7. The vibration actuator as claimed in claim 1, wherein the first vibration mode is a vibration mode which causes the elastic body to displace in a non-axisymmetric direction.

8. The vibration actuator as claimed in claim 1, further comprising a junction plane of the elastic body and the electromechanical converting element; and
   wherein the support member is disposed in the junction plane surface side of the elastic body.

9. A vibration actuator comprising:
   an elastic body formed in an annular shape;
   an electromechanical converting element joined to the elastic body;
   a relative motion member which is in pressure contact with the elastic body; and
   a plurality of support members disposed at a contact surface of the electromechanical converting element to support the elastic body, wherein,
      in the elastic body, by excitation of the electromechanical converting element, a first vibration mode vibrating within the annular shaped elastic body and vibrating in a direction intersecting a plane including the elastic body, and in a second vibration mode which is a bending vibration having one or more nodal circles and one or more nodal diameters is caused to occur, in the elastic body, vibration which causes relative motion to be performed is caused to arise between the elastic body and the relative motion member, and
      the support members are located at an intersection point of the nodal circle and nodal diameter of the second vibration mode in the elastic body away from said center axis of said elastic body.

10. The vibration actuator as claimed in claim 9, further comprising a standard plane, which is the junction surface of the elastic body and the electromechanical converting element.

11. The vibration actuator as claimed in claim 9, wherein the electromechanical converting element includes four respectively independently controlled fan shaped electromechanical converting elements.

12. The vibration actuator as claimed in claim 11, wherein the respective electromechanical converting elements are established in positions which exclude the positions of the support member.

13. The vibration actuator as claimed in claim 9, wherein the elastic body is pressed towards the relative motion member.

14. The vibration actuator as claimed in claim 9, wherein the first vibration mode is a vibration mode which causes displacement of the elastic body in a direction in which a diameter thereof extends and a direction in which the diameter contracts.

15. The vibration actuator as claimed in claim 9, wherein the first vibration mode is a vibration mode which causes the elastic body to displace in a non-axisymmetric direction.

16. A vibration actuator comprising:

an annular elastic body;

at least one electromechanical converting element disposed on the elastic body; and a relative motion member disposed on a side of said elastic body opposite from said electromechanical converting element, and support members that support said elastic body at intersections of nodal circles and nodal diameters created by said two modes of vibration;

wherein by applying a force to said electromechanical element, at least two modes of vibration are generated in said elastic body, thereby causing the elastic body to undergo elliptic motion, which in turn causes the relative motion member to move, wherein said support members are disposed on positions away from a center axis of said elastic body.

17. The vibration actuator claimed in claim 16 wherein the at least one electromechanical converting element is a piezoelectric element.

18. A vibration actuator comprising:

an annular elastic body; and support members that support said elastic body at intersections of nodal circles and nodal diameters created by two modes of vibration of said vibration actuator;

wherein at least two modes of vibration are generated in said elastic body, thereby causing the elastic body to undergo elliptic motion, which in turn causes movement of a relative motion member, wherein said support members are disposed on positions away from said center axis of said elastic body.

* * * * *